United States Patent [19]

Russel

[11] Patent Number: 4,777,510
[45] Date of Patent: Oct. 11, 1988

[54] COPYING APPARATUS AND METHOD WITH EDITING AND PRODUCTION CONTROL CAPABILITY

[75] Inventor: Matthew J. Russel, Mendon, N.Y.

[73] Assignee: Eastman Kodak Company, Rochester, N.Y.

[21] Appl. No.: 132,637

[22] Filed: Dec. 9, 1987

Related U.S. Application Data

[63] Continuation of Ser. No. 940,695, Dec. 11, 1986, abandoned, which is a continuation-in-part of Ser. No. 809,547, Dec. 16, 1985.

[51] Int. Cl.$^4$ ............... G03G 15/00; G03G 15/01
[52] U.S. Cl. ...................... 355/7; 355/3 R; 355/4; 355/6; 355/8; 355/14 C
[58] Field of Search ............ 355/14 R, 14 E, 14 CH, 355/7, 8, 3 R, 3 CH, 4, 15, 6

[56] References Cited

U.S. PATENT DOCUMENTS

| | | | |
|---|---|---|---|
| 3,576,367 | 4/1971 | Sable | 355/6 |
| 3,713,861 | 1/1973 | Sharp | 117/15 |
| 3,894,178 | 7/1975 | Pugsley | 178/6 |
| 3,914,043 | 10/1975 | McVeigh | 355/4 |
| 3,926,518 | 12/1975 | Berry et al. | 355/8 |
| 3,960,445 | 6/1976 | Drawe | 355/4 |
| 4,008,962 | 2/1977 | Nepper | 355/77 |
| 4,045,218 | 8/1977 | Mc Veigh | 355/14 X |
| 4,045,219 | 8/1977 | Bean | 355/4 X |
| 4,191,465 | 3/1980 | Boase et al. | 355/3 SH |
| 4,234,250 | 11/1980 | Mailloux | 355/4 |

(List continued on next page.)

FOREIGN PATENT DOCUMENTS

| | | |
|---|---|---|
| 2462072 | 7/1980 | France . |
| 3035731 | 9/1980 | Fed. Rep. of Germany . |
| 57-119379 | 7/1982 | Japan . |
| WO84/04607 | 11/1984 | PCT Int'l Appl. . |
| 2155860 | 10/1985 | United Kingdom . |

OTHER PUBLICATIONS

Xerox Disclosure Journal vol. 11, No. 5, p. 253.
Patent Abstracts of Japan, vol. 6, No. 233, (P-156) (1111) 19 Nov. 1982 (Japan 57-132178).
Patents Abstracts of Japan, vol. 7, No. 45, (Japan 57-194675) (E-160) (1190), 23 Feb. 1983.
Patents Abstracts of Japan, vol. 8, No. 202, (P-300) (1639), 14 Sep. 1984 (Japan 59-87470).
Patents Abstracts of Japan, vol. 8, No. 82, (P-268) (1519), 14 Apr. 1984 (Japan 58-224362).

*Primary Examiner*—A. C. Prescott
*Attorney, Agent, or Firm*—Norman Rushefsky

[57] ABSTRACT

Apparatus and method for producing color-accented or otherwise edited reproductions of original documents with high productivity. Information of originals to be reproduced with, for example, color-accenting are highlighted on the originals with a marker pen or encircled with the highlight. The highlighted originals are serially passed during a copy run over an image scanner that is sensitive to the highlighted portions. The locations of the highlighted portions for each original are detected and stored in a bit map. In one embodiment an original is imaged onto two image frames of an electrostatically charged photoconductor. The photoconductor not being capable of distinguishing highlighted areas from background reproduces the electrostatic images through an optical exposure as if no highlighting is present. A selective erase element is provided to erase from one frame, areas on the original that were highlighted and to erase from the other frame, areas on the original that were not highlighted. The image frames are developed, each with a differently colored toner, and the developed areas transferred in register to a copy sheet to provide a reproduction with color accenting. In another embodiment the information is electronically scanned onto the photoconductor using an LED or laser light source and the appropriate image frames exposed in accordance with the highlighting on the documents.

Highlighting of an original may also be used to indicate areas to be selectively screened, filled with a screen tint, areas to be deleted, or areas to be repositioned.

44 Claims, 6 Drawing Sheets

OTHER PUBLICATIONS

| Patent No. | Date | Inventor | Class |
|---|---|---|---|
| 4,239,374 | 12/1980 | Tatsumi et al. | 355/14 E |
| 4,248,528 | 2/1981 | Sahay | 355/14 R |
| 4,251,154 | 2/1981 | Russel | 355/4 |
| 4,294,536 | 10/1981 | Paxton | 355/14 C |
| 4,305,652 | 12/1981 | Dattilo et al. | 355/6 |
| 4,336,994 | 6/1982 | Banton | 355/4 |
| 4,352,553 | 10/1982 | Hirahara | 355/14 E |
| 4,354,758 | 10/1982 | Futaki | 355/14 E |
| 4,372,674 | 2/1983 | Yukawa et al. | 355/14 D |
| 4,451,137 | 5/1984 | Farley | 355/14 C |
| 4,477,176 | 10/1984 | Russel | 355/3 TR |
| 4,494,862 | 1/1985 | Tanaka | 355/14 C |
| 4,519,695 | 5/1985 | Murai et al. | 355/14 R |
| 4,554,591 | 11/1985 | Kee | 358/256 |
| 4,558,374 | 12/1985 | Kurata | 356/380 |
| 4,598,999 | 7/1986 | Kurata et al. | 356/380 |
| 4,640,601 | 2/1987 | Deguchi et al. | 355/3 R |

COPYING APPARATUS AND METHOD WITH EDITING AND PRODUCTION CONTROL CAPABILITY

CROSS-REFERENCE TO RELATED APPLICATIONS

This application is a continuation application of U.S. application Ser. No. 940,695, filed Dec. 11, 1986 now abandoned which in turn is a continuation-in-part application of U.S. application Ser. No. 809,547, filed Dec. 16, 1985.

This application is related to U.S. application Ser. No. 940,694, filed on even date herewith in the names of George N. Tsilibes et al and entitled "*Electrophotographic Reproduction Apparatus and Method With Selective Screening*" and now U.S. Pat. No. 4,740,818, which in turn is a continuation-in-part of U.S. application Ser. Nos. 809,548 and now abandoned in favor of continuation U.S. application Ser. No. 028,804, filed Mar. 20, 1987 and 809,549, both filed Dec. 16, 1985 both now abandoned.

This application is also related to U.S. application Ser. Nos. 809,546 and 809,550, both filed Dec. 16, 1985 (now abandoned).

BACKGROUND OF THE INVENTION

1. Field of the Invention

The present invention relates to electrophotographic reproduction apparatus and methods and, more specifically, to improvements in reproducing originals with color accenting or otherwise providing special treatment of highlighted information on an original document.

2. Brief Description of the Prior Art

In the prior art as exemplified by U.S. Pat. No. 3,914,043, there is described an apparatus for electrophotographically reproducing originals with color accenting. In this apparatus, an original document is located on a support and indicator members located adjacent the support adjusted to designate the location of lines to be reproduced in a first color and lines to be reproduced in a second color. The original is exposed onto a photoconductive drum and the lines of the electrostatic image of the original that are to be reproduced in the second color will be erased and the remaining image developed with toner of the first color color. A second exposure of the original is made on the photoconductor and the lines of the electrostatic image that are to be reproduced in the first color are erased and the remaining image developed with toner of the second color. The two developed images are transferred in register to a copy sheet to provide the reproduction.

It will be noted, however, that the indicator members must be associated with the support and the adjustments made while at the copying machine. It would be desirable to eliminate the necessity for the person who wishes the document to be edited to have to go over to the copier and painstakingly move indicators to identify the areas that are to be, for example, color accented.

In U.S. Pat. No. 4,558,374 (Kurata et al) a picture data processing device is disclosed wherein edited reproductions of an original are made by reproducing or extracting only a selected portion of an original. A separate sheet referred to as a mark specifying original is employed to draw lines comprising boundaries for the extracted portion. The separate sheet is "read" by an image sensor and count value signals stored that are related to these boundary lines. The document sheet is then "read" by the image sensor. The data signal used to reproduce the original is inhibited by these signals except for the region which is to be extracted. A problem with this processing device is that productivity is substantially lowered by the requirement for use of a separate sheet with each original. Where a multisheet document is desired to be reproduced with selective editing desired for several sheets in the document the use of extra mark specifying sheets presents a burden since the sheets need to be identifiable with their respective original.

SUMMARY OF THE INVENTION

The invention pertains to an apparatus and method for electrophotographically reproducing an original document sheet so that the reproduction is provided with areas of spot color or with other special treatment. An original document sheet that is, for example, to be reproduced with spot color or color accenting is highlighted in the areas in which spot color is desired. The original is then scanned by the apparatus to provide signals regarding the locations of the areas of image information to be specially treated. The document sheet is then imaged upon an electrostatically charged photoconductor and developed so that the areas to be specially treated are, say, developed with toner of a different color from that of other portions of the reproduction.

Alternatively, the special treatment may involve selective halftone screening of an area of the reproduction, shifting of one area relative to another, or erasure of a portion from the original or provide for job stream programming when reproducing a multisheet original document.

BRIEF DESCRIPTION OF THE DRAWINGS

The subsequent description of the preferred embodiment of the present invention refers to the attached drawing wherein.

DETAILED DESCRIPTION OF THE PREFERRED EMBODIMENTS

Because electrophotographic reproduction apparatus are well known, the present description will be directed in particular to elements forming part of or cooperating more directly with the present invention. Apparatus not specifically shown or described herein are selectable from those known in the prior art.

Figure 2:
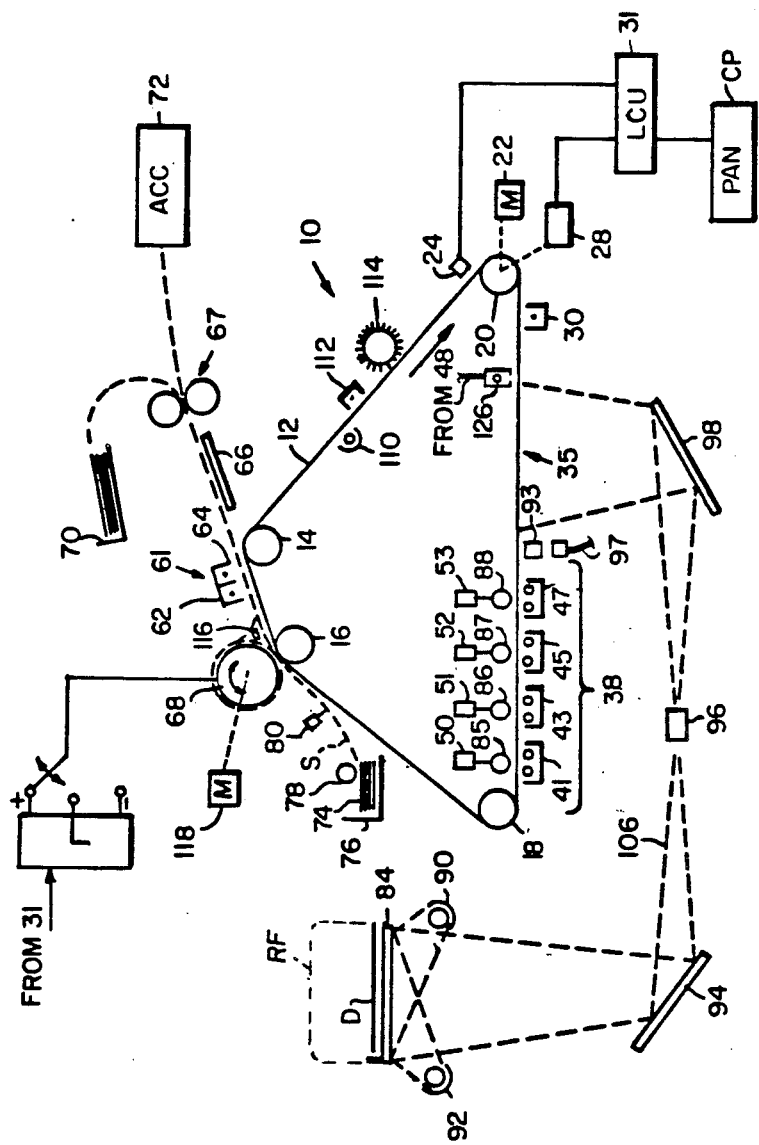
FIG. 2 is a schematic of a side view of the operating elements of a multicolor electrophotographic reproduction apparatus for practice of the present invention.

With reference now to FIG. 2, a four color multicolor electrophotographic reproduction apparatus is shown.

The apparatus 10 includes a closed loop, flexible image transfer member, or photoconductive web 12. The web 12, is supported on rollers 14, 16, 18 and 20. The rollers are mounted on the copier frame (not shown) with one of the rollers, for example, roller 20, relatively driven by a motor 22 to effect continuous movement of the web 12 in a clockwise direction about its closed loop path. The web has a plurality of sequentially spaced, nonoverlapping image areas which pass successively through electrophotographic processing stations (charge, expose, develop, transfer, clean) located about the path of the web. The web also includes timing marks (or regularly spaced perforations) which are sensed by appropriate means, such as timing signal generator 24 to produce timing signals. Such signals are sent to a computer controlled logic and control unit 31. The LCU 31 controls the entire electrophotographic process based on the instantaneous location of the web in the travel path. An encoder 28 associated with the roller drive motor 22 also produces timing signals for the LCU. The signals from the encoder cause the LCU to fine tune the process timing. The LCU 31 has a digital computer, preferably a microprocessor. The microprocessor has a stored program responsive to the input signals for sequentially actuating, then de-actuating the work stations as well as for controlling the operation of many other machine functions.

Programming of a number of commercially available microprocessors such as one or more INTEL model 8086 microprocessors (which along with others can be used in accordance with the invention), is a conventional skill well understood in the art. This disclosure is written to enable a programmer having ordinary skill in the art to produce an appropriate control program for the microprocessor(s). The particular details of any such program would, of course, depend on the architecture of the designated microprocessor.

Figure 3:
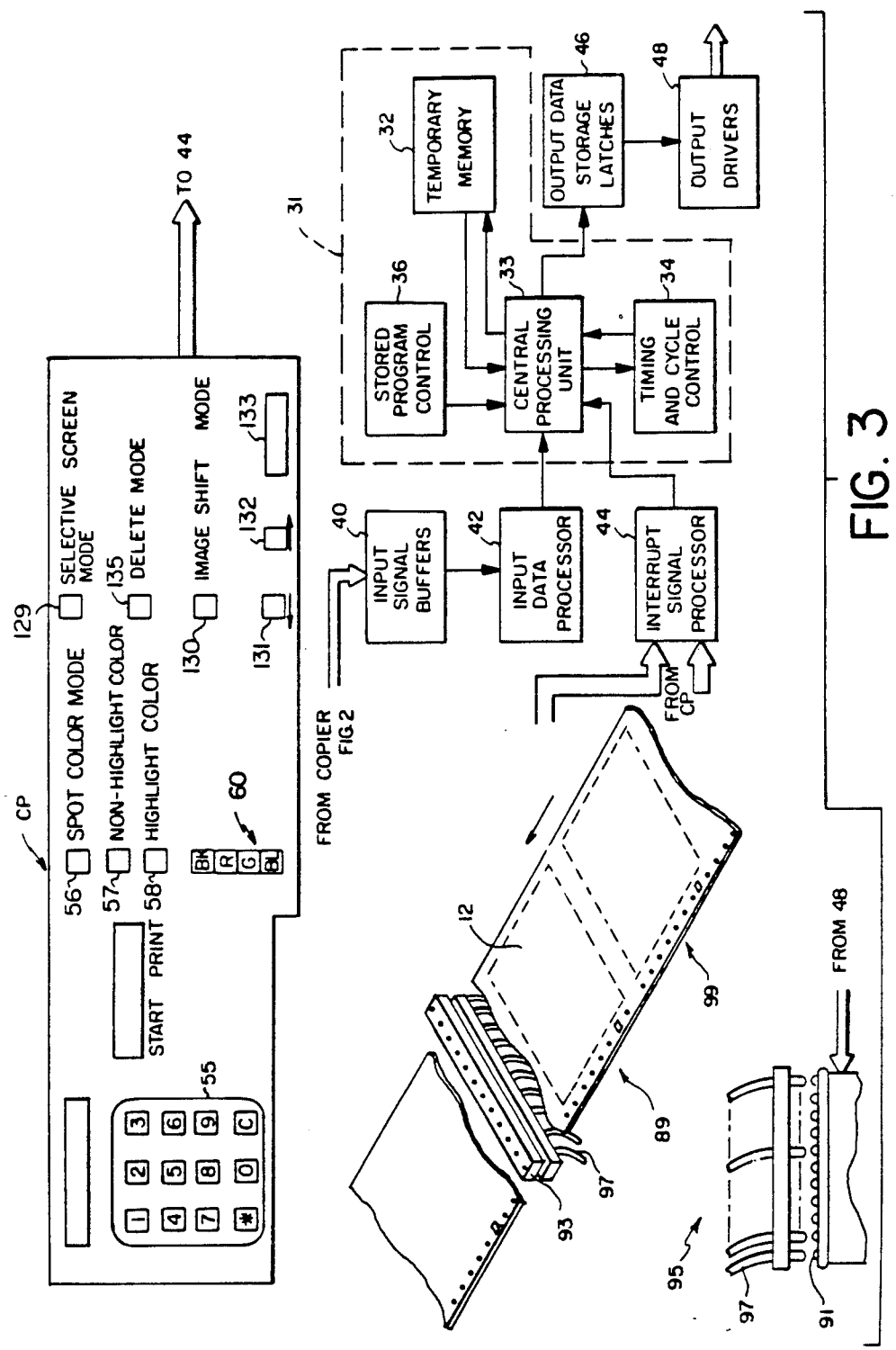
FIGS. 3 and 3a are a schematic illustrating a data input station and block diagrams of controls for controlling the apparatus shown in FIG. 2.

With reference also now to FIG. 3, a block diagram of logic and control unit (LCU) 31 is shown which interfaces with the apparatus 10. The LCU 31 consists of temporary data storage memory 32, central processing unit 33, timing and cycle control unit 34, and stored program control 36. Data input and output is performed sequentially under program control. Input data are applied either through input signal buffers 40 to an input data processor 42 or to interrupt signal processor 44. The input signals are derived from various switches, sensors, and analog-to-digital converters. The output data and control signals are applied to storage latches 46 which provide inputs to suitable output drivers 48, directly coupled to leads. These leads are connected to the various work stations, mechanisms and controlled components associated with the apparatus.

Figure 1:
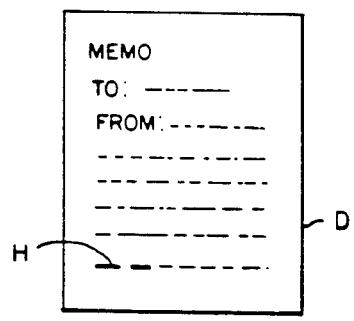
FIG. 1 is an illustration of an original document sheet showing highlighting of areas(s) to be specially treated.

With reference now to FIG. 1, an original document sheet D typically containing original information in but one color is to be reproduced with spot or accent coloring. The sheet D is marked by the person desiring the reproduction with a highlight H over the information to be reproduced in a color different from that of the remaining information on the document sheet. The highlighting may be an ultraviolet (UV) active ink, of say yellow or light pink color or any color, preferably visually transparent so as not to obliterate or mask the area so covered. Optionally, the highlighting could be visually colorless so as to give no indication that it has been applied. The copier or reproduction apparatus 10 includes a control panel (CP) with keyboard 55 for indicating number of copies and input buttons for indicating machine mode. Where spot color is desired, the spot color mode button 56 is depressed and selection made of the respective colors for the non-highlighted information and highlighted information using buttons 57, 58 and color indicating buttons 60. In the machine to be described, spot color will be available in four colors. Once a color, for example black, is chosen for reproduction of the non-highlighted information, the operator may choose to have the highlighted information reproduced in red, green or blue. These inputs are converted into signals and stored in temporary memory 32 via interrupt signal processor 44.

Figure 3A:
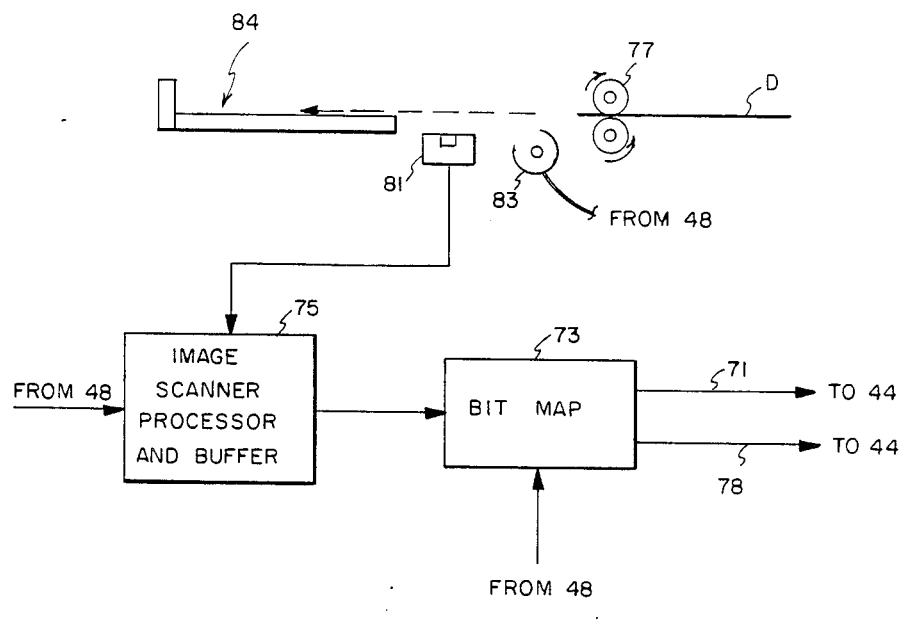

The operator, after inputting the number of copies and exposure information, feeds the document sheet into driven rollers 77 (see FIG. 3A), which in turn drive the document sheet over a scanning device 81. The scanning device may comprise a UV source of light 83, and a plurality of photoelectric sensors, such as CCD's or photodiodes, that are responsive to light in the spectral range emitted by the U.V. active ink. The sensors are arranged linearly across the transverse direction of the document sheet to scan the entire sheet as it is transported onto transparent glass platen 84. Suitable means may be provided for detecting the leading and trailing edges of the sheet to provide signals to commence and terminate scanning respectively. As each line of the sheet is scanned some of the sensors will detect UV illuminated areas directly above them and their respective signals will represent areas of highlighting as distinguished from signals of other sensors not detecting highlighting. Circuitry using thresholding and/or comparator devices may be provided so as to distinguish highlighted areas from unhighlighted areas on a support that is somewhat reflective to UV light. The signals from each scanner sensor is fed to an image scanner processor and buffer 75 which temporarily stores the signals from the photosensors for processing to logically decide which signals represent highlighted areas and which signals represent unhighlighted areas. The scanning device is similar to conventional image scanners except that it is provided with filter or sensors sensitive to a threshold level of light of predetermined spectral content. Preferably, the highlighting material when exposed to U.V. light source 83 will fluoresce in a particular spectral zone such that the sensor will respond to that fluorescence as distinguished from its background. Sharp cut-off dyes exist such as Europium (III) thenolyl tri fluoroacetonate and that will enable this action and will provide a measurable signal difference between the highlighter and the sheet, even though some sheets may contain fluorescent whiteners. Conventional yellow highlight pens available in stationery stores may also be suitable. Signals representing each pixel or small area on the document and identifying it in binary format as to whether or not it is considered highlighted are fed to a bit map memory storage array 73 which stores the signals. After the document has been thus scanned, it reaches a stop provided at an edge of the platen, which positions the document sheet so as to be in register with image frames on the photoconductive web 12 during an exposure.

The original document sheet D is now oriented, image side down, on transparent glass platen 84 that is supported by the copier frame. Exposure lamps 90, 92, such as xenon flash tubes, are located beneath the platen 84 within the frame. The lamps flood the document sheet with light and a reflected image of the document sheet is transmitted via mirror 94, lens 96, and mirror 98 in focus to an area 35 lying in the plane of the web 12. Since it is desired to reproduce the document sheet in two colors, the document sheet D is illuminated, two times in succession to form two separate electrostatic latent images thereof. The timing of the flash of lamps 90, 92 is controlled by the LCU and related to the travel of the web 12 to expose adjacent, nonoverlapping areas of the web to the images of the document sheet. One or more corona charging units, exemplified by corona charger 30, is located upstream of the exposure area 35, and applies a uniform primary electrostatic charge, of say negative polarity, to the web 12 as it passes the charger and before it enters the exposure area. The photoconductive properties of the web cause the primary charge in the exposed areas of the web to be discharged in that portion struck by the exposure light. This forms latent imagewise charge patterns on the web in the exposed areas corresponding to the image on the document sheet. It should be appreciated that the properties of the ink used for highlighting are that it is substantially transparent so that the image information therebeneath is visible and is of such a color that the photoconductor cannot distinguish it from a white background.

In accordance with the signals stored in the bit map, a selective erase means is provided to selectively erase areas of one image frame representing highlighted areas and areas of the other image frame representing unhighlighted areas. Further discussion regarding this means will be described later. Thereafter, travel of the web then brings the areas bearing the selectively erased latent images into a development area 38. The development area had a plurality of magnetic brush development stations, each containing a different color of toner. For example, the toner colors may be black, red, green and blue. Thus, the red toner particles may be in station 43, green toner particles in station 45, blue particles in station 47 and black particles in station 41. The toner particles are agitated in the respective developer stations to exhibit a triboelectric charge of opposite polarity to the latent imagewise charge pattern. Backup rollers 85, 86, 87, and 88, located on the opposite side of web 12 from the development area, are associated with respective developer stations 41, 43, 45 and 47. Actuators 50, 51, 52 and 53 selectively move respective backup rollers into contact with the web 12 to deflect the web from its travel path into operative engagement with respective magnetic brushes. The charged toner particles of the engaged magnetic brush are attracted to the oppositely charged latent imagewise pattern to develop the pattern.

The logic and control unit 31 selectively activates an actuator in relation to the passage of an image frame that is to be processed with the respective color toner. If, for example, the first image frame is to be developed with black toner and the second image frame is to be developed in red and as the image frame containing the image to be developed in black reaches the development station 41, actuator 50 moves the backup roller 85 to deflect the web so that the latent charge image is developed by attracting black toner particles from the station 41. As soon as the image area leaves the effective development area of the station 41, the actuator 50 returns the backup roller 85 to its nondeflecting position. A similar cycle is accomplished by the logic and control unit 31 for the development of the image sector containing only the highlighted information with use of only red toner from station 43.

The developed black and red image frames must be transferred to a receiver sheet in accurately registered superimposed relation to form a reproduction of the original document sheet with color accenting in red of the highlighted information. Apparatus for providing such registered transfer are fully described in U.S. Pat. Nos. 4,477,176, issued Oct. 16, 1984 and 4,251,154, issued Feb. 17, 1981 in the name of Matthew J. Russel, the contents of which are incorporated herein by this reference. Briefly, this is accomplished by feeding a receiver sheet or support S, from a supply stack 74 stored in hopper 76, in synchronism with movement of the first image frame so that the receiver sheet engages the web and is registered by mechanism 80 with the first image frame. A transfer roller 68 includes a compliant insulating surface thereon and is biased to a potential suitable for transfer of the developed image on the first image sector to the copy sheet S and to tack receiver sheet S to roller 68. Roller 68 is driven by a stepper motor 118 which receives actuating signals from the LCU 31.

Roller 68 may also be a biased vacuum roller or a roller with sheet clamping mechanisms to clamp the sheet to it.

Continued movement of web 12 and synchronized rotation of roller 68 brings the lead edge of the copy sheet back into transferable relationship with the web as the lead edge of the next toner image arrives at roller 68. At this point, the bias on roller 68 is reversed to repel sheet S away from roller 68 back into contact with web 12. Receiver sheet S will be carried by web 12 so that the receiver sheet is in registration with the image on the second image frame. This image is transferred to the receiver sheet by charger 61 including transfer charger 62 and detack 64. The copy sheet is separated from the web and conveyed by either vacuum transport or as shown air transport 66 to roller fuser 67 and then to exit hopper 70 or an accessory finishing unit 72.

While the image is being fixed in fuser 67, the web 12 continues to travel about its path and proceeds through a cleaning area.

To facilitate toner removal from the web, a corona charging station 112 and a rear erase lamp 110 may be located upstream of a cleaning unit 114 to neutralize any charge remaining on the web and thus reduce the adherence forces of the toner to the web.

Figure 4:
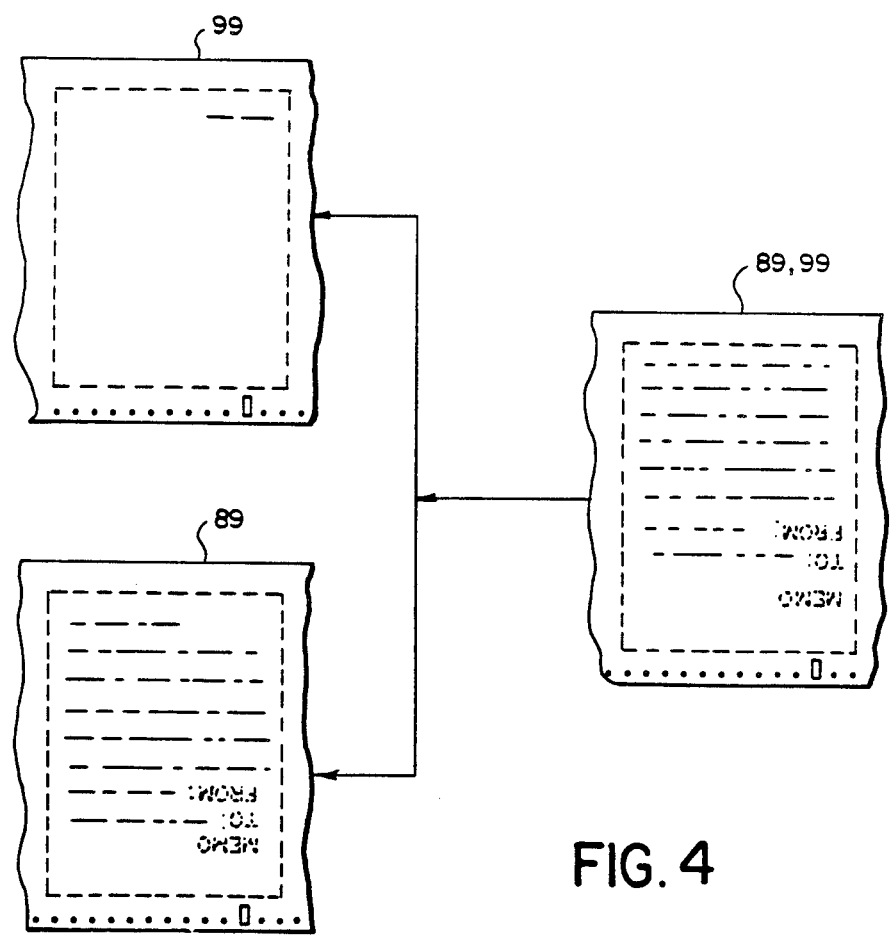
FIG. 4 is an illustration of various image frames on the photoconductor used to produce a color accented copy.

As may be noted from FIGS. 3 and 4, numbers 89, 99 identify the exposure of each of the image frames used for reproduction of document D. The locations of the image frames are known based on timing signals used for making the exposure onto each of the frames and registration of an edge of the original with the stop on the platen. As the first image frame 89 passes above the selective erase means signals from lead 71 of bit map 73 are inputted through interrupt signal processor 44 into the LCU with signals representing areas to be selectively erased on frame 89. These areas correspond to those that were highlighted on the original document D. The LCU in response to timing signals from the timing signal generator 24 and/or encoder 28 illuminates through output drivers 48 light emitting diodes (LED's). The LED's may comprise a linear bank of arrays situated transverse to and proximate the web surface or as shown in FIG. 3, the array 95 of LED's 91 may illuminate the web via optical fibers 97 and gradient index lens array 93, such as a SELFOC (trademark of Nippon Sheet Glass Co., Ltd.) array which focuses light from the fibers onto the photoconductor 12. The latent electrostatic image or image frame 89 is then developed with black toner at development station 41. With the passage of the next image frame over the selective erase means, signals are provided to the LCU 31 over lead 78 which provides an inverse logic operation to the information in the bit map. That is signals in the bit map corresponding to areas on the original that are not highlighted are outputted to the LCU for illumination of appropriate LED's to selectively erase all information on image frame 99 except for that to be color accented. The latent electrostatic image on image frame 99 is then developed with red color toner at development station 43. As indicated above, the two developed image frames are transferred in register to the same surface of a support such as receiver sheet S. After fixing of the images to the sheet S a reproduction is provided of the original with color accenting in accordance with the highlights provided on the original.

Figure 2A:
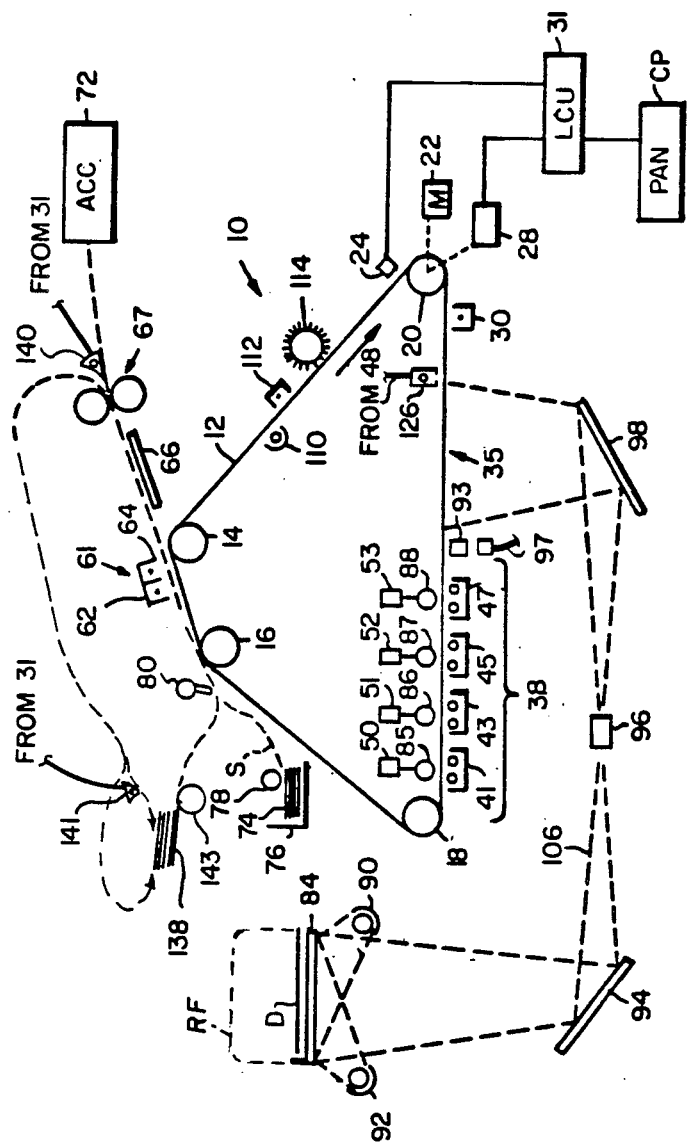
FIG. 2a is a similar view to that of FIG. 2 of a modified apparatus.

In the embodiment shown in FIG. 2a, a modification is provided. In lieu of forming different colored image frames in succession and transferring them to a receiver sheet it may be preferred, when making multiple copies using spot color, to reproduce all copies with the information that is to be reproduced in one color, store them in say an intermediate tray and then remove them serially from the tray for receipt of the next color. Thus, in FIG. 2a, the document D is repeatedly exposed and imaged upon successive image frames of photoconductor 12 at exposure area 35. The information which is highlighted on the original document D and is to be reproduced in say red is selectively erased on each of these image frames. All the image frames are developed with black colored toner and transferred and fixed each to a respective receiver sheet S. The receiver sheets are returned to an intermediate tray using diverters 140, 141 which are solenoid actuated members movable in response to signals from the LCU 31. The diverter 140 is adapted to direct the path of the receiver sheets either to the intermediate tray 138 or to the accessory unit 72 which in this embodiment may include also an output tray. The diverter 141 is adapted to direct the receiver sheets so that they are either turned over or not turned over when stored in the intermediate tray 138. When the number of exposures of image frames is sufficient for the number of copies requested, additional successive exposures of document D are made to reproduce on a corresponding number of image frames to the highlighted information. The information that was not highlighted on the original document is now selectively erased from these image frames and developed with red color toner. The receiver sheets in intermediate tray 138 are now delivered serially into timed registration with the image frames on the web by feed roller 143 and registration mechanism 80 to transfer the red color information to the sheets. The red toner image on the sheets are then fixed and they are fed serially to the accessory unit 72. Thus, there is provided a plurality of reproductions with spot color from, for example, a single color original. In addition, the ability to invert the receiver sheets in the intermediate tray enables the spot coloring to be applied to the opposite surface of a sheet.

While the invention has been described with regard to a flash exposure of a document, other types of exposure are also contemplated. For example, the image may be scanned upon the electrostatically charged photoconductor and may be imaged thereon using a scanning reflection exposure of the original or using light which has been electronically generated from, say, a bit stream. In the former, segments of the original are scanned by a light source and the light modulated by the document is imaged upon the photoconductor. In the latter (see FIG. 5 where the same numbers identify similar components to that described for the embodiment of FIG. 2), the information contents of a document are digitized into electrical signals by a suitable electronic image "reading" device 120 and these signals used to modulate a light source such as a laser or LED imaging source 125 which is then imaged upon the photoconductor. In the latter example, the selective erase function provided by the laser or LED's could be incorporated into the electronic imaging device and accomplished electronically.

Figure 5:
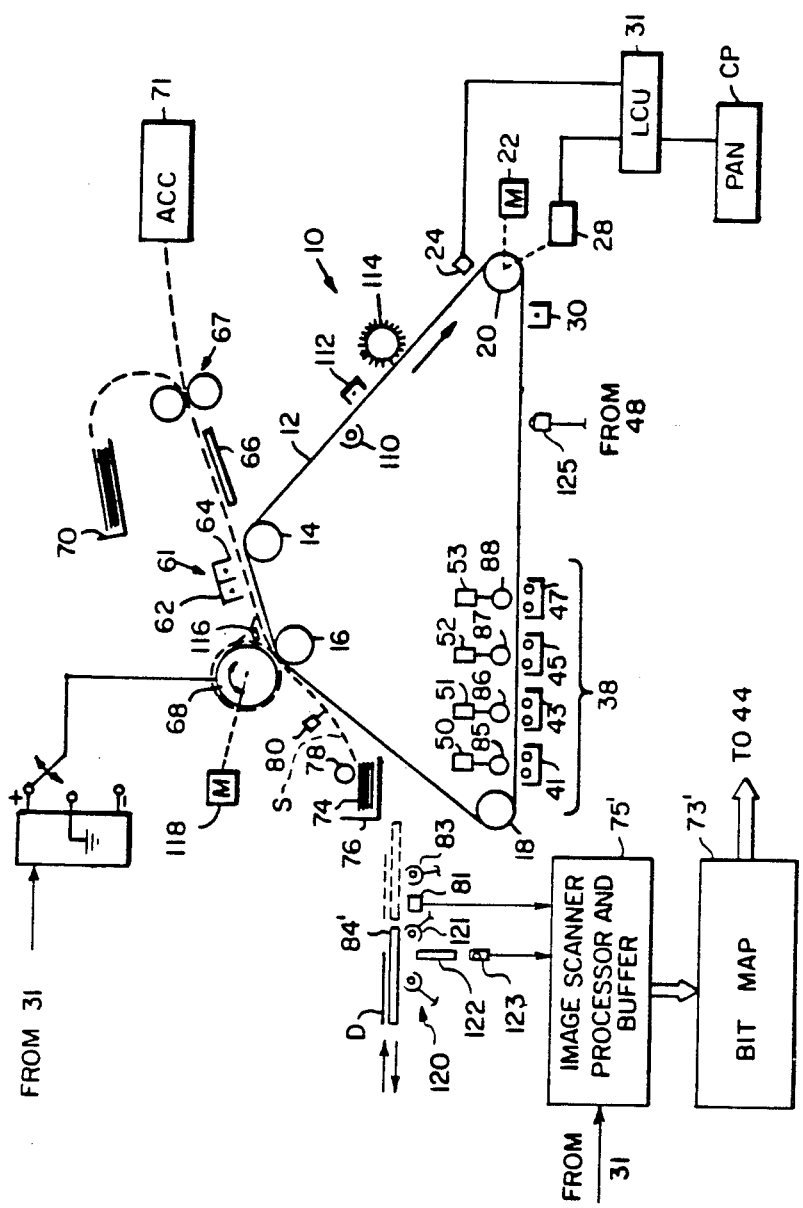
FIG. 5 is a schematic of a side view of the operating elements of another multicolor electrophotographic reproduction apparatus for practice of the present invention.

Thus, where document D is supported on a moving platen and when the platen 84' is moved to the right in FIG. 5 by suitable conventional means not shown, signals from LCU 31 illuminate lamp 83 to scan the document with a narrow beam of illumination. The sensor 81 sensitive to the UV light source of the highlighting detects the locations of the highlighting and feeds this information for processing and storing in the bit map. On the return movement of the platen the document is again scanned by, for example, the separate source image reading device 120 that includes lamps 121, gradient index lens array 122 and charge coupled device (CCD) array 123. These signals are processed by image scanner processor and buffer 75' and stored in the bit map 73' so that the bit map now contains for each pixel image information and highlight information stored in binary signal format. The image scanner process and buffer 75' would be similar to conventional image reading units but includes a processor for processing highlighted information as described for the embodiment of FIG. 3a plus a means of adding an information bit to each pixel of information indicating whether or not it relates to highlighted information. For exposure of each of the two image frames the information is conveyed to the LCU and selected LED's on the LED exposure array 125 illuminated to record only the information desired to be reproduced for each color. While separate scanning devices are shown in FIG. 5 the invention contemplates the use of a single scanner where in one mode the highlighting may be read and in a second mode the image information on the entire document sheet may be read.

In the use of an electronic exposure element such as LED array 125 it is preferred to use a photoconductor and toning system that will attract toner particles to areas of the photoconductor that have been exposed. This is done since in most documents the background constitutes the major area of the document. For reproduction of the first image frame the LCU actuates the LED array 125 (which may include a grdient index lens array not shown) through drivers 48 to only output the information to be reproduced in black. This may be done by gating or selectively passing only that information for pixels which do not contain signal information indicating they are derived from highlighted areas on the original document D. Thus, the information in the original document to be reproduced in red has not been imaged upon this image frame of the photoconductor, but has been "erased" electronically in accordance with signals stored in the bit map. Similarly, for exposure of the information to be reproduced in red on the second frame the signals from the LCU illuminate the LED to "print out" only that information which is to be developed with red toner. Again, the binary signals indicating that a pixel is derived from a highlighted area is used to gate or allow the image information to pass for use in illuminating corresponding LED's for forming an image pixel on the photoconductor 12. As described for the apparatus of FIG. 1, the image frames are developed with respective colored toners and transferred in register to receiver sheet S.

The use of highlighting on the original document sheet may also be used to designate areas to be selectively screened. Rather than using a digitizing tablet as described in the commonly assigned U.S. application Ser. No. 940,694, filed on even date herewith and entitled, "Electrophotographic Reproduction Apparatus and Method With Selective Screening, in the names of George N. Tsilibes et al, the contents of which (and its parent applications identified above) are incorporated herein by this reference, to determine the coordinates of the areas desired for selective screening, these coordinates may be "read" by the highlight sensor and used to selectively illuminate an image of a halftone screen on the photoconductor in the area desired to be screened. A preferred way of accomplishing this is through use of a photoconductor having an integral screen as one of the layers thereof, see U.S. Pat. No. 4,294,536. In this mode (using the apparatus of FIG. 2) the first and second image frames on the photoconductor would both be exposed to all the information on the document sheet and the area to be screened selectively erased from the first image frame. The second image frame would have the non-screened areas selectively erased and the entire frame exposed to a screen pattern. The two image frames would then be developed and transferred in register to the same surface of a receiver sheet or support. Illumination from an electroluminescent panel 126 would be from the rear of the photoconductor (opposite that which is developed) and this mode called up by pressing button 129. In this regard, reference is made to commonly assigned U.S. application Ser. No. 809,550, filed on Dec. 16, 1985 and entitled, "Apparatus and Method for Electrophotographically Producing Copy From Originals Having Continuous-Tone and Other Content, in the name of Michael D. Stoudt et al; the contents of which are also incorporated herein by this reference.

Another mode of operation of the apparatus is the deletion mode, where the information highlighted is desired to be deleted. In this mode, called-up by pressing button 135 the second frame is not exposed, and only image transfer takes place using the developed information on the first frame which comprises the reproduction of the unhighlighted portions, with the highlighted portions having been selectively erased in accordance with the description above.

Thus, one copy of the same highlighted document may be made with the highlighted information deleted and the next copy made with the highlighted information color accented and other copies made comprising a reproduction of the entire document sheet in a normal mode where the highlighting is not present on the reproduction.

Still another mode is provided for in the apparatus 10 wherein a portion of an image may be reproduced in the same or a different color but shifted relative to another portion. The control panel (CP) includes shift indication directional buttons 131, 132 for inputting the desired direction of image shift once this mode has been called-up by pressing button 130. By pressing a directional button several times the total inputted displacements may be added and displayed on display 133. In this mode, the image shift may be accomplished by adjusting the timing determining the exposure location of the second image frame or adjusting the timing between movement of the receiver sheet into engagement with say the second image frame after the first image frame image has been transferred using normal registration. The information on the original to be shifted or otherwise specially treated may be surrounded by a highlight on the original or covered by the highlight. The image frames may be developed with different colored toners or the same color toner in accordance with information input by the operator.

Image shift on the apparatus shown in FIG. 5 may be accomplished using one image frame where the reproduction is to be developed in only one color. The shifting of the image information may be accomplished electronically by having the image scanner processor 75 recalculate the new location for placement of the highlighted information.

Other types of image shift are contemplated herein include duplexing wherein a simplex original may have the highlighted portion transferred to the backside of a support either in the same color or a different color from that transferred to the front side. Such duplexing may be accomplished using the means shown in FIG. 2a or the roller 68 of FIG. 2 and having this roller change direction of rotation to place the backside of the support in register with the second image frame. See, for example, U.S. Pat. No. 4,191,465.

While the preferred embodiments have been described wth regard to producing reproductions in two colors or providing a special treatment to a portion of information to be reproduced from an original, the invention also contemplates that more than one special treatment may be made to information in one area of an original or that different treatments may be provided to two or more areas. Thus, the programming of the logic and control unit 31 may accept multiple mode inputs for highlighted areas permitting, for example, spot color in red and shifting of the accented color to a position different from which it appears on the original.

The programming for the LCU may be designed so that code marks located in a selected margin area of the original can be used to distinguish between different areas of highlighted information. Thus, if three or more color spot coloring is desired using exposure of three or more image frames, a code using the highlight ink may be provided in the margin adjacent a highlighted area to indicate development with red colored toner and a different code designation used in the margin adjacent another highlighted area to indicate development with another say green colored toner whereas no highlighting may be used to indicate development with black colored toner. It has also been indicated that highlighting of the original may take the form of outlining of the information in a highlight ink. Where a fine line is used to outline the area to be specially treated, a code may be used where an outline of an area comprised of two closely spaced lines represents an area to be treated differently from that having an outline of a single line. Thus, an area not surrounded by a highlight may be developed using black colored toner with the remainder of the image information selectively erased on this frame. The next image frame may be developed with red colored toner wherein the areas not surrounded by the single highlight outline on the original selectively erased. The third image frame may be developed with green colored toner with the areas not surrounded by a double highlighted outline on the original selectively erased. The three image frames when transferred in register onto a copy sheet comprise a three color, spot color, reproduction of the single color original. The code would be such as to enable it to be read and deciphered by the LCU's logic and thus obviate the need for the operator to input such information manually or at least enable the apparatus to distinguish between more than two areas requiring special treatment. In lieu of a code, different highlight inks may be used and sensors provided for distinguishing between such different inks so that more than two areas for special treatment may be provided for. For example, two rows of sensors 81 may be provided, one respective to one type of highlight ink, the other responsive to another. Alternatively, one row of sensors 81 may be used with changing electronic thresholding. The sensors may scan each line first for areas of highlighting providing signal outputs reaching a first threshold level and scan the same line for areas of highlighting having signal outputs reaching a second lower threshold. Those areas not reaching the second threshold level being assumed not to have highlighting. Those areas reaching the second threshold but not the first being assumed to be an area to receive special treatment different from that of areas reaching the first threshold and areas being deemed not to have any highlighting. Sensors 81 are available that are adapted to distinguish between inks of three different colors. These sensors include a pair of overlapped filters wherein each of the filters admit light of different respective spectral ranges. Where the filters overlap, they admit light of a third spectral range. Still another sensor may be used that relies on the fact that highlighting will not require the pixels per inch (or centimeter) sensivitivity of conventional image readers. This sensor may have a mask overlying the row of sensors so that the mask establishes repeating groups of four along the row wherein each group is characterized by having one pixel sensor covered by a filter of one color, the next adjacent pixel sensor covered by a filter of a second color, the then next adjacent pixel sensor covered by a filter of a third color and the next adjacent pixel sensor covered by a clear portion of the mask. These sensors would be coupled to suitable circuitry so that every fourth pixel sensor is adapted to sense light of a predetermined spectral content.

Still another modification may be provided in which an area that is highlighted is desired to be overlaid with a screen tint to make it stand out on the page. In this case, the first exposure is not selectively erased within the highlighted area, and the second "exposure" is erased everywhere except for the highlighted area bu no optical exposure of the original is allowed. A back-lit screen is turned on to expose the second image frame to a level that will create a screen tint of any grey-level, say 15–20% and subsequently the photoconductor image frames are toned either in the same colors or in different colors and transferred to the copy sheet. The result is a copy with designated areas covered with a tint screen and superimposed text or graphics.

While the invention has been described with regard to a highlighting ink that may be detected through light sensing means, other types of inks may be used including transparent magnetic inks with magnetic readers detecting same. The ink may be placed on the "backside" of a sheet and thus need not be transparent when so placed. When the highlighting ink is placed on the backside, the positions of the sensor 81 and source 83 would be adjusted so as to be in position to read the backside of the sheet. Quite interestingly, the highlight ink may be placed on the frontside of the document as is more convenient, and allowed to "bleed" through the paper sheet to the backside thereof. The highlight ink UV light source and sensor may then be positioned to read the backside of the sheet to determine the location of the area to be specially treated. This may permit for a better signal to noise ratio especially where the UV would otherwise have to be sensed from the front where it covers black test. A further alternative is to permit for selectable reading of the frontside or the backside. Where, for example, a recirculating document feeder is used to circulate document sheets serially from the bottom of a stack supported in the tray to the exposure platen and back to the tray at the top of the stack the UV light source and image sensor may be located just downstream of the vacuum feeder feeding the sheets from the bottom of the tray. The tray in such a feeder is usually located above the exposure platen, see for example, U.S. Pat. No. 4,451,137 (Farley), the contents of which are incorporated by this reference. Where the sheets are stacked image face up, the highlight sensor will be used to read the image face for highlighting before each sheet is fed to the exposure platen for exposure and then returned to the tray. When a mode is selected for reading the backside of each sheet, the stack of sheets will be placed in the tray image side down with the first sheet of the multisheet document at the bottom of the stack. The sheets will be driven serially from the bottom of the stack and read by the highlight sensor. To be in proper position for exposure, the sheets need to be not inverted by the vacuum feeder. One approach is to divert the sheets image face down to a conventional sheet direction reversing device which does not turn the sheet over but merely receives it while the sheet is moving in one direction and reverses its drive rollers to move the sheet in a different direction. In this example, a document positioner such as shown in Farley may have the sheet directed thereto image side down and then be actuated to drive the sheet onto the exposure platen. After exposure a similar sheet direction reversing drive may be used to receive the sheets serially from the exposure platen and return them to the top of the tray with the image side facing down.

While the invention has been described with regard to the use of highlighting ink or indicia directly upon the document sheet being reproduced, in a modification of the method and apparatus of the invention the transparent highlighting ink may be placed upon a transparent sheet that has been overlaid upon the document sheet. In this modification, the overlay and document sheet comprise the document sheet to be reproduced when exposed together. Still another modification of the invention comprises the use of a separate sheet such as a transparent sheet containing the indicia indicating the areas to be specially treated. For example, a transparent sheet may be overlaid upon a document sheet and the areas to be specially treated blackened or covered with a suitable mark that is not necessarily transparent. The document sheet and the transparent sheet may then be read successively by an electronic image reading device and the special treatment provided during the reproduction process in accordance with signals generated in response to the markings on the transparent sheet without reproduction of the markings on the transparent sheet.

Still other modifications may include the use of highlighting to assist in slip sheet insertion, chapterization and/or margin shift. In slip sheet insertion, a separate tray is usually provided for storing sheets of desired colors for insertion at appropriate places into collated sets of copies. For example, with regard to FIG. 2a assume the apparatus is being operated in a single color or black and white simplex-simplex reproduction mode. Also, assume that a simplex multisheet document original is placed as a stack in a tray that forms a part of a recirculating feeder RF for duplication in multiple collated sets. With the original document sheets image face-up, last sheet at the bottom, the documents may be advanced serially from the bottom of the tray, past the highlight sensor 81, 83 (FIG. 3a), stopped at the exposure platen for a single exposure and returned to the top of the document stack. Each document sheet is circulated a fixed number of times in accordance with the number of collated sets to be produced. Assume, now that through for example, "calling-up" of a special code number using the keyboard 55 or dedicated button on the control panel, the apparatus is placed in an automatic slip-sheet insertion mode. In this mode highlighting marks placed on any original document sheets interspersed within the stack of originals will be detected by the sensor and will be used to actuate feeding of one of the colored sheets stored for this purpose in tray 138 so that the information on this highlighted sheet original is imaged on the photoconductor, developed and then transferred to one of the colored sheets. The colored sheets in this mode are fed to the accessory unit 72 where they are placed or stored in collated order with copies previously made on say white bond paper from sheets stored in copy sheet supply tray 76.

In the chapterization mode, simplex originals are reproduced in duplex form and are required to have the first page of a new chapter start on the front of a new sheet and not be placed on the rear of the last page of the prior chapter. The use of highlighting of originals as described herein lends itself to good advantage for this task. Thus, when the apparatus is placed in a chapterization mode by again either "punching-in" a keyboard code or employing a dedicated button, the duplex mode will be established and employ tray 138 as an intermediate storage tray. In this mode, tray 138 stores copy sheets that have each received an image on one surface after having been fed from tray 76 and are awaiting to be advanced to receive the image of the next original on the reverse side. Certain of the original document sheets in the stack provided in the recirculating feeder are highlighted with the fluorescent ink to indicate either they are the last pages of respective chapters or that they are the first pages of respective chapters. The machine logic will be adjusted in accordance with one of these alternatives. As the original document sheets are circulated through the recirculating feeder for reproduction, a sheet with highlighting will be detected in this mode and the detected highlighting will be used to indicate, for example, that this is the last page of a chapter. Under control of the LCU, if this last page is an even number page of the chapter, the copy sheet reproducing this page is circulated back to the intermediate tray 138 for feeding therefrom for receipt of the image from this last page on the backside thereof. If this last page is an odd number then the copy sheet upon which the image of the last page is formed will be sent to the accessory unit 72, or an output tray. Thus, machine set-up time is substantially reduced from the known practice of manually stepping each sheet through a simulated run to identify which sheets constitute the first page of a chapter.

Still other modifications may include the use of margin shift. Presently, margin shift is an option available on copier-duplicators wherein the operator provides inputs as to how much shift is desired and the timing of a advancement of the copy sheet is adjusted by the LCU according to the amount of shift desired. The use of margin shift is desired to ensure that information is not hidden in the bound area when a multisheet reproduction is bound or stapled into a finished set. Since the desired margin is best determined from looking at the original one may draw a vertical line down each original sheet to indicate where the margin for the information on the document is to be. A second line may be drawn down each original in a different highlight color indicating where the present margin for the information is. The highlight colors may have assigned functions so that the LCU is adapted to determine which line each represents. After reading each sheet using the highlight ink sensor the distance between the lines can be determined and the timing of copy sheet advancement adjusted to provide desired margin shifts.

In many applications it is desirable in a single production job to have some sheets of a multi-sheet document original be reproduced with portions thereof selectively erased, some sheets reproduced with accent color and the feature(s) of chapterization and/or slip sheet insertion also employed. The apparatus and method of the invention lends itself quite well to this objective for automatically producing finished sets having multi-requirements. In this regard, as noted previously a code may be established where nonreproducing highlight ink spots arranged in various pre-established patterns in the margin area of a document indicate different functions. The lines or areas to be selectively erased or color accented would still be indicated by highlighting the lines or areas or surrounding same with a line of highlight ink. However, the job function to be performed for that sheet would also be carried by that sheet obviating the need to call up codes on the machine or push buttons to input the job function. Also, the use of different color inks can be associated with different functions and patterns. With this combination of code and color multifunctional job streaming may be provided for and be interpretable by the LCU which stores the pre-established code information in memory and compares same with that on each sheet as it is read just prior to being exposed. In providing for this, it would be most desirable to use the type of duplexing copier-duplicator illustrated in FIG. 2. With the addition of a conventional recirculating document feeder and extra supply trays for providing slip-sheet insertion a highly productive copier-duplicator is provided for producing finished sets. As is known, duplex copies may be produced on this apparatus by having roller 68 remove a copy sheet from the web 12 after one image is transferred to the sheet and then have the roller reverse its direction of rotation with diverter 116 moved to peel the sheet from roller and direct same into alignment with the image frame reproducing the next image for transfer of this image onto the backside of the copy sheet.

In the description of the invention heretofore the highlight ink described was either transparent or colored to a color so as not to be reproducable by the photoconductor. In the embodiment illustrated in FIGS. 2 and 2a, the LED selective erase source was used for erasing charge. In certain production jobs it is desired to renumber documents when reproducing a multisheet document original. This can be accomplished in the apparatus of FIGS. 2 and 2a by having a black mark placed on each original document sheet where a number is to be reproduced on its corresponding reproduction. The black mark would be provided with a highlight ink that fluoresces and is detectable by the sensor 81. As each original is reproduced serially (preferably by using a recirculating feeder), the black mark on each original will, when the document sheet is exposed onto an image frame, leave an area of charge on the image frame that corresponds to this mark. Since the location for this area on the image frame is known due to sensing by the sensor 81 of the highlighted mark on the original the LCU in its stored program control 36 may have a character generator for generating signals that relate to numbers in a descending count order. This count order may commence with a number entered by the operator through the keyboard or correspond to the number of originals in the original document stack. Since in a recirculating feeder of the type described, the last sheet is copied first the LCU may actuate the LED's to expose a different number upon each of the charge spots provided on each image frame by respective black marked areas on each original document sheet. Thus, the image frames when developed provide a finished numbered set of sheets that have the numbers provided by the copier-duplicator apparatus.

The invention has been described in detail with particular reference to the preferred embodiments thereof, but it will be understood that variations and modifications can be effected within the spirit and scope of the invention.

I claim:

1. A method for reproducing a document sheet comprising:
   providing a document sheet having image information and providing indicia on the same sheet indicating image area(s) of the document sheet to be specially treated;
   detecting the indicia and producing signals of the locations of the area(s) of the image information to be specially treated;
   imaging image information from the document sheet onto each of two image frames of an electrostatically charged photoconductor and using the signals to adjust charge on one of the image frames in a corresponding area thereof identified by the indicia without reproducing the indicia;
   developing the resulting electrostatic image as adjusted on the one image frame and developing the electrostatic image formed on the second image frame with toner of a second color; and
   transferring the two developed images onto a surface of a support.

2. The method of claim 1 and wherein the image area(s) to be specially treated are not reproduced on said one image frame but such image area(s) are reproduced on a second image frame.

3. The method according to claim 1 and wherein the adjustment of charge comprises the erasure of charge from the photoconductor to a level below which will permit development.

4. The method according to claim 1 and wherein the adjustment of charge comprises the formation of a halftone screen pattern on the photoconductive member.

5. A method for reproducing a document sheet comprising:
   providing the document sheet having image information with indicia indicating image areas to be specially treated;
   scanning the document sheet for the indicia and producing signals of the locations of the areas of the image information to be specially treated;
   imaging the document sheet upon an electrostatically charged photoconductor with the indicia being both transparent to any image information that may be beneath the indicia and indistinguishable from background areas during such imaging and using the signals to adjust the process of reproduction of the document sheet; and
   developing the resulting electrostatic image as adjusted.

6. The method of claim 5 and wherein the document sheet is imaged twice, once onto each of two image frames, and the image areas to be specially treated are not reproduced on one image frame but such image areas are reproduced on a second image frame 7. The method of claim 9 and wherein the image frames are developed and transferred to a support so that the reproduction of the image areas to be specially treated is shifted relative to the reproduction of the remaining image information as compared with the respective positions of said images on the original.

8. A method of reproducing a document sheet comprising:
   providing the document sheet having image information with highlighting drawn over or around a portion of the original image information indicating image areas to be specially treated;
   scanning the document sheet to provide first signals for reproducing all the image information of the document sheet and second signals relating to areas of the document sheet to be specially treated; in response to both types of signals, exposing a charged photoconductor with image information and developing the photoconductor so that the reproduction of the portion of the original image information that is highlighted is developed with a different color toner from that used to develop information corresponding to original information in the document sheet that was not highlighted.

9. The method of claim 8 and including transferring of the developed images to a support.

10. The method of claim 8 and wherein the reproduction of the portion of the original information that is highlighted is exposed on one image frame of the photoconductor and the reproduction of the portion of the original that was not highlighted is reproduced on a different image frame of the photoconductor.

11. The method of claim 10 and wherein the developed images are transferred to a support.

12. Apparatus for reproducing a document sheet having image information with indicia indicating image areas to be specially treated:
   scanning means for scanning a document sheet for area(s) to be specially treated and for producing signals of locations of the area(s) of image information to be specially treated;
   a photoconductive member;

means for electrostatically charging the photoconductive member;

means for illuminating the document sheet and for exposing at least portions of the image information on the document sheet upon each of two image frames upon the photoconductive member and for not reproducing the indicia upon the photoconductive member;

means responsive to the signals for adjusting of charge on at least one of the image frames of the photoconductive member at area(s) corresponding to those to be specially treated;

means for developing the resulting electrostatic images as adjusted; and means for transferring the developed image frames to a support.

13. The apparatus of claim 12 and wherein the adjusting means comprises means for erasure of charge from the photoconductor to a level below which will permit development.

14. The apparatus of claim 12 and wherein the adjusting means comprises the information of a halftone screen pattern on the photoconductive member.

15. The apparatus of claim 12 and wherein the adjusting means includes means for erasing on one image frame image information corresponding to image information not indicated for special treatment, 16. The apparatus of claim 12 and wherein the adjusting means comprises means for erasure of charge from the photoconductor to a level below which will permit development.

17. The apparatus of claim 12 and wherein the adjusting means comprises the formation of a halftone screen pattern on the photoconductive member.

18. The apparatus of claim 13 and including means for developing the two image frames with different colored toners; and wherein the transferring means includes means for transferring the developed images on the two image frames in register onto the same surface of a support.

19. An electrophotographic process comprising:
providing an original containing information to be reproduced, with a portion to be reproduced in a color different from the rest of the original;
marking over said portion with a marking material of a type which has a given spectral reflectance when on the original and also permits discernable projection of the information marked over;
sensing the portion of the original which has been marked over and creating a signal indicative to the location of that portion on the original;
placing the original in an exposure position;
while the original is in the exposure position, creating two electrostatic images by twice exposing at least one charged photoconductive member with an image of the original, the spectral characteristics of the photoconductive member and of the exposing illumination being such that the photoconductive member does not respond substantially differently to the spectral reflectance of the marking material than it does to the noninformation areas of the original;
erasing portions of said electrostatic images as controlled by said signal, to create an image corresponding to the marked over portion of the original and an image corresponding to the rest of the original;
toning the electrostatic images with different color toners; and
transferring the two toned images to a receiving medium in registration to create a reproduction of the original with the portion corresponding to the marked over portion being a different color than the rest of the reproduction.

20. A method for producing reproductions of an original document sheet with additional information not appearing on the originals comprising:
providing an original document sheet having image information and providing machine readable indicia on the sheet indicating an image area of the reproduction upon which additional image information not appearing on the original document sheet is to be printed on the reproductions of the document sheet;
detecting the indicia and producing signals related to the location of the area of the reproduction to receive the additional information;
imaging image information from the original document sheet upon an electrostatically charged photoconductor image frame and using the signals to adjust charge on the same photoconductor image frame with signals related to the additional information in the corresponding area on the photoconductor identified by the indicia;
developing the electrostatic image of the information on the original and the additional information; and
transferring the developed image to a record member to form a reproduction.

21. The method of claim 20 and wherein the indicia is a dark colored area on the original document sheet.

22. The method of claims 20 or 21 and wherein the additional information is printed by modifying a charge adjusting member with electrical signals containing image information signals and the image information from the original document sheet is imaged upon the photoconductor by light reflected from the original document sheet onto the photoconductor.

23. The method of claim 22 and wherein the charge adjusting member comprises means for modulating light in accordance with said image information signals.

24. The method of claim 22 and wherein data representing characters are stored in a character generator and the electrical signals are used to modify the charge on the photoconductor with character information.

25. The method of claim 22 and wherein a multisheet document is provided as the original and an indicia is associated with each document sheet indicating an area on the reproduction where a number is to appear and wherein a set of reproductions of the original multisheet document includes the additional information as numbers identifying the page order of the reproduction in the set of reproductions.

26. Apparatus for reproducing a document sheet having original image information and highlighting drawn over or around a portion of the original information indicating areas to be specially treated; the apparatus comprising:
means for scanning the document sheet and in response to the highlighting providing first signals for reproducing all the original image information of the document sheet and second signals relating to areas of the document sheet to be specially treated;
a photoconductive member;
means for charging the photoconductive member;

means responsive to both types of signals for exposing and developing the charged photoconductive member with the entire original image information so that the reproduction of the portion of the original information that is highlighted is developed with a different color toner from that used to develop information corresponding to original information on the document sheet that was not highlighted.

27. A method of reproducing a document sheet comprising:

providing the document sheet having original image information with indicia placed over or around a portion of original image information indicating image areas to be reproduced in a color different from that used to reproduce the remaining information on the document sheet;

scanning the document sheet to generate signals in response to the indicia relating to areas of the document sheet to be colored differently; and using the signals to create an electrostatic image of the entire original information on the document sheet; and developing the electrostatic image corresponding to the original image information having the indicia thereon or thereabout with toner of one color and the electrostatic image corresponding to the original image information not having indicia thereon or thereabout with toner of a different color.

28. The method of claim 27 and wherein the electrostatic image of the entire information on the document sheet has a portion formed on one image frame a complementary portion formed on a second image frame and wherein the developed image from each frame is transferred in register upon a support.

29. Apparatus for producing reproductions of an original document sheet with additional information not appearing on the original, comprising:

means for scanning an original document sheet having machine readable indicia indicating an image area of the reproduction upon which additional image information not appearing on that original is to be printed on the reproductions of the original document sheet and for producing signals related to the locations of the area of the reproduction to receive the additional information;

means for electrically storing signals related to the additional information;

means for imaging image information from the original document sheet upon an electrostatically charged image frame of a photoconductor and responsive to the said electrically stored signals and to the signals related to the locations to adjust charge on the image frame in the corresponding area thereof identified by the indicia;

means for developing an electrostatic image on the image frame of the information on the original and the addition information; and means for transferring the developed image to a record member to form a reproduction.

30. A method for producing reproductions of an original document sheet with additional information not appearing on the originals comprising:

providing an original document sheet having image information and providing machine readable indicia accompanying the sheet indicating an image area of the reproduction upon which additional image information not appearing on the original document sheet is to be printed on the reproductions of the document sheet;

detecting the indicia and producing signals related to the location of the area of the reproduction to receive the additional information;

imaging image information from the original document sheet upon an electrostatically charged photoconductor image frame and using the signals to adjust charge on the photoconductor with signals related to the additional information in the corresponding area on the photoconductor image frame identified by the indicia;

developing the electrostatic image of the information on the original and the additional information; and transferring the developed image to a record member to form a reproduction.

31. The method of claim 30 and wherein the indicia is a dark colored area accompanying the original document sheet.

32. The method of claim 20, 30 or 31 and wherein the image information is imaged upon the photoconductor by forming a reflection image of the image on the original document and exposing such image upon the photoconductor.

33. Apparatus for reproducing a multisheet document, at least some of the sheets having image information with accompanying indicia indicating image areas to be specially treated:

scanning means for scanning the document sheets for areas to be specially treated and for producing signals of locations of the areas of image information to be specially treated;

a photoconductive member;

means for electrically charging the photoconductive member;

means for serially exposing the photoconductive member with image information on the document sheets without reproducing the indicia upon the photoconductive member;

means responsive to the signals for adjusting of charge on the photoconductive member on areas corresponding to those to be specially treated; and means for developing the resulting electrostatic image as adjusted.

34. The apparatus of claim 33 and wherein the scanning means senses indicia associated with some of the sheets indicating a chapterization operation and generates second signals for performing such operation; and means responsive to such second signals for operating said apparatus in a chapterization mode.

35. The apparatus of claim 34 and wherein the scanning means senses indicia associated with some of the sheets indicating a slip-sheet insertion operation and generates third signals for performing such operation; and means responsive to such third signals for feeding slip-sheets from a supply tray providing same.

36. The apparatus of claim 33 and wherein the scanning means senses indicia associated with some of the sheets indicating a slip-sheet insertion operation and generates second signals for performing such operation; and means responsive to such second signals for feeding slip-sheets from a supply tray providing same.

37. The apparatus of claim 33 and wherein the scanning means senses indicia associated with some of the sheets indicating a margin shift operation and generates second signals for performing such operation; and means responsive to such second signals for operating said apparatus to shift the margins of the images on the reproductions of the said some of the sheets indicating a margin shift operation.

38. A method for producing reproductions of an original document sheet information to be reproduced and having machine readable ink indicia that is not to be reproduced; the method comprising:
   placing the indicia on the side of the sheet containing the information to be reproduced;
   scanning the indicia on the back of the aforesaid side to read indicia ink that bleeds through the sheet and generating signals in response to sensing of such indicia;
   in response to sensing of such indicia affecting an operation of the reproduction machine.

39. The apparatus of claim 37 and wherein the adjusting means comprises means for erasure of charge from the photoconductor to a level below which will permit development.

40. The apparatus of claim 37 and wherein the adjusting means comprises the formation of a halftone screen pattern on the photoconductive member.

41. The apparatus of claim 37 and including means for transferring a developed image to a support.

42. The apparatus of claim 41 and wherein the means for exposing the document sheet twice, once onto each of two image frames, and the adjusting means includes means for erasing on one image frame image information corresponding to image information not indicated for special treatment.

43. The apparatus of claim 42 and including means for developing the two image frames with different colored toners; and wherein the transferring means includes means for transferring the developed images on the two image frames in register onto a support.

44. Apparatus for reproducing a document sheet having image information with certain image areas thereof to be specially treated;
   scanning means for scanning a sheet of indicia indicating areas of the document sheet to be specially treated and for producing signals of locations of the areas of image information located beneath the indicia to be specially treated;
   a photoconductive member;
   means for electrostatically charging the photoconductive member;
   means for illuminating the document sheet and for imaging image information on the document sheet including the image information beneath the indicia upon the photoconductive membe and for not reproducing the indicia upon the photoconductive member;
   means responsive to the signals for adjusting of charge on the photoconductive member on areas corresponding to those to be specially treated; and
   means for developing the resulting electrostatic image as adjusted.

* * * * *